United States Patent [19]
Asai

[11] Patent Number: 5,789,053
[45] Date of Patent: Aug. 4, 1998

[54] BONDED DISC AND AN APPARATUS FOR MANUFACTURING THE SAME AND THE MANUFACTURING METHOD THEREOF

[75] Inventor: Ikuo Asai, Ohbu, Japan

[73] Assignee: Kabushiki Kaisha Meiki Seisakusho, Ohbu, Japan

[21] Appl. No.: 632,064

[22] Filed: Apr. 15, 1996

[30] Foreign Application Priority Data

Dec. 5, 1995 [JP] Japan ................... 7-344498

[51] Int. Cl.$^6$ ................... B32B 3/00; B29B 7/00
[52] U.S. Cl. ................... 428/64.1; 428/64.2; 428/64.4; 428/65.2; 428/913; 264/1.33; 264/328.1; 264/328.8; 369/275.1; 369/283
[58] Field of Search ................... 428/64.1, 64.2, 428/64.4, 65.2, 913; 369/275.1, 283; 264/1.33, 328.1, 328.8

[56] References Cited

U.S. PATENT DOCUMENTS

| | | | |
|---|---|---|---|
| 4,781,879 | 11/1988 | Oishi | 264/328.12 |
| 4,788,015 | 11/1988 | Sakai et al. | 264/1.3 |
| 5,031,172 | 7/1991 | Umeda et al. | 369/275.1 |

FOREIGN PATENT DOCUMENTS

| | | |
|---|---|---|
| A-62-45809 | 2/1987 | Japan. |
| A-3-90325 | 4/1991 | Japan. |
| A-5-220778 | 8/1993 | Japan. |
| A-6-75892 | 3/1994 | Japan. |

*Primary Examiner*—Patrick Ryan
*Assistant Examiner*—Elizabeth Evans
*Attorney, Agent, or Firm*—Oliff & Berridge PLC

[57] ABSTRACT

Two disc bases D having different information are molded in a time by a pair of cavities formed when clamping the molds 1 and 2, which are filled with the molten resin by being injected. After taking out the disc bases from the mold by a product taking out apparatus, those are coated with a reflection layer by a sputtering apparatus and subsequently coated with a protection layer by a coating apparatus and finally bonded by a bonding apparatus to obtain a single disc VD. This disc VD can avoid the mechanical troubles such as distortion, bending, twisting or peeling off of the bonded portion in a time lapse after being bonded, because those disc bases VD are molded in a pair of cavities 3, 3 formed in a mold using the material of the same lot, i.e. under the same condition. Representative drawing FIG. 1.

8 Claims, 6 Drawing Sheets

BONDED DISC AND AN APPARATUS FOR MANUFACTURING THE SAME AND THE MANUFACTURING METHOD THEREOF

BACKGROUND OF THE INVENTION

FIELD OF THE INVENTION

The present invention relates to a bonded disc and an apparatus for manufacturing the same and a manufacturing method thereof, in more detail, it relates to an optical disc such as a video disc and a compact disc, i.e. a bonded disc which is manufactured by bonding two disc bases, an apparatus for manufacturing the same and a manufacturing method thereof.

In the case of manufacturing an optical disc, as disclosed in the Japanese Patent Publication 62-45809 and the Japanese Patent Laid-open No. Hei 3-90325, first, a cavity is formed by clamping (or closing) molds, subsequently a molten resin is injected into the cavity by an injection apparatus. To the molded disc base, an information is transferred from a stamper disposed in the cavity. In the molded disc base, a reflection layer and a protection layer are formed, and one side thereof is recorded with the information to give a completed disc (hereinafter referred to as "single disc"), and the opposite surface is printed with letters such as a title.

Also as disclosed in the Japanese Patent Publication No. Hei 6-75892 and the Japanese Patent Laid-open No. Hei 5-220778, a formation of a plurality of independent cavities on the abutting face of a movable mold and a stationary mold at the time of the mold clamping is known. This is formed in such a manner as providing an injection nozzle in each cavity connected with the channel for molten resin from a common injection machine, whereby one injection machine can supply the molten resin to each cavity to mold a plurality of disc bases at a time and contribute to increase the productivity of the single disc.

On the other hand, conventionally a so called bonded type of disc is produced, in which, for example, for the purpose of making use of both sides of a disc for recording, two sheet of disc bases having half thickness compared with the conventional one are molded and bonded together into one disc (hereinafter referred to as "bonded disc"). In the case of the bonded disc, in general the central portion of the disc, where no information is recorded, is attached by a sheet of label printing the title etc.

The disc base thus-manufactured requires, for the purpose of recording clear signals, the mechanical properties such as low birefringence, and a uniform birefringence between the outer circumference and the inner circumference, no stress distortion, no bending and a uniform thickness and surface finishing.

In manufacturing disc bases, due to the factors such as molding conditions and common difference of molds, there can be difference in thickness etc depending on the disc bases molded. Further, if the lot of the materials to be molded as disc bases is different, the property of the molded disc base may be different. In the case of manufacturing a disc by bonding two sheet of disc bases as shown in FIG. 6, if the disc base thickness of $D_1$ and $D_2$ are different, due to the difference of the inner stress and at the elapse of time, there have been problems such as a stress distortion, a bending and a twisting on a disc VD or peeling off between bonded disc bases.

SUMMARY OF THE INVENTION

The present invention is to provide a bonded disc, an apparatus for manufacturing the same and a manufacturing method thereof, which is improved in avoiding distortion of a disc, bending, twisting or peeling off etc.

The invention of a bonded disc according to the claim 1 is to bond the disc bases which are molded with a pair of different cavities formed in one mold and having different information.

The invention of a manufacturing apparatus for a bonded disc according to the claim 2 is, for attaining the above purpose, characterized in that said apparatus has a mold which forms a pair of cavities in one mold when clamping and molds two disc bases having different information respectively.

The invention of a manufacturing apparatus for a bonded disc according to the claim 3 is, for attaining the above purpose, characterized in that, in the manufacturing apparatus of the bonded disc according to the claim 2, the transferring surface of one of two stampers disposed in the cavities has no transferring information.

The invention of a manufacturing apparatus for a bonded disc according to the claim 4 is, for attaining the above purpose, characterized in that, in the manufacturing apparatus of the bonded disc according to the claim 2, one of two cavities is not disposed with a stamper.

The invention of a method for manufacturing a bonded disc according to the claim 5 is, for attaining the above purpose, characterized in that, in a method for manufacturing one bonded disc by bonding two disc bases, said two sheet of disc bases are molded in a pair of cavities formed in a mold at a time and bonded each other.

The invention of a method for manufacturing a bonded disc according to the claim 6 is, for attaining the above purpose, characterized in that, in a method for manufacturing for a bonded disc in the claim 5, said pair of cavities formed in a mold are provided with different stampers.

The invention of a method for manufacturing a bonded disc according to the claim 7 is, for attaining the above purpose, characterized in that, in a method for manufacturing for a bonded disc in the claim 6, one stamper disposed in one of the cavities has no information.

The invention of a method for manufacturing a bonded disc according to the claim 8 is, for attaining the above purpose, characterized in that, in a method for manufacturing for a bonded disc in the claim 5, one of a pair cavities formed in a mold is not provided with a stamper.

DETAILED EXPLANATION OF THE INVENTION

EXAMPLE

Figure 1:
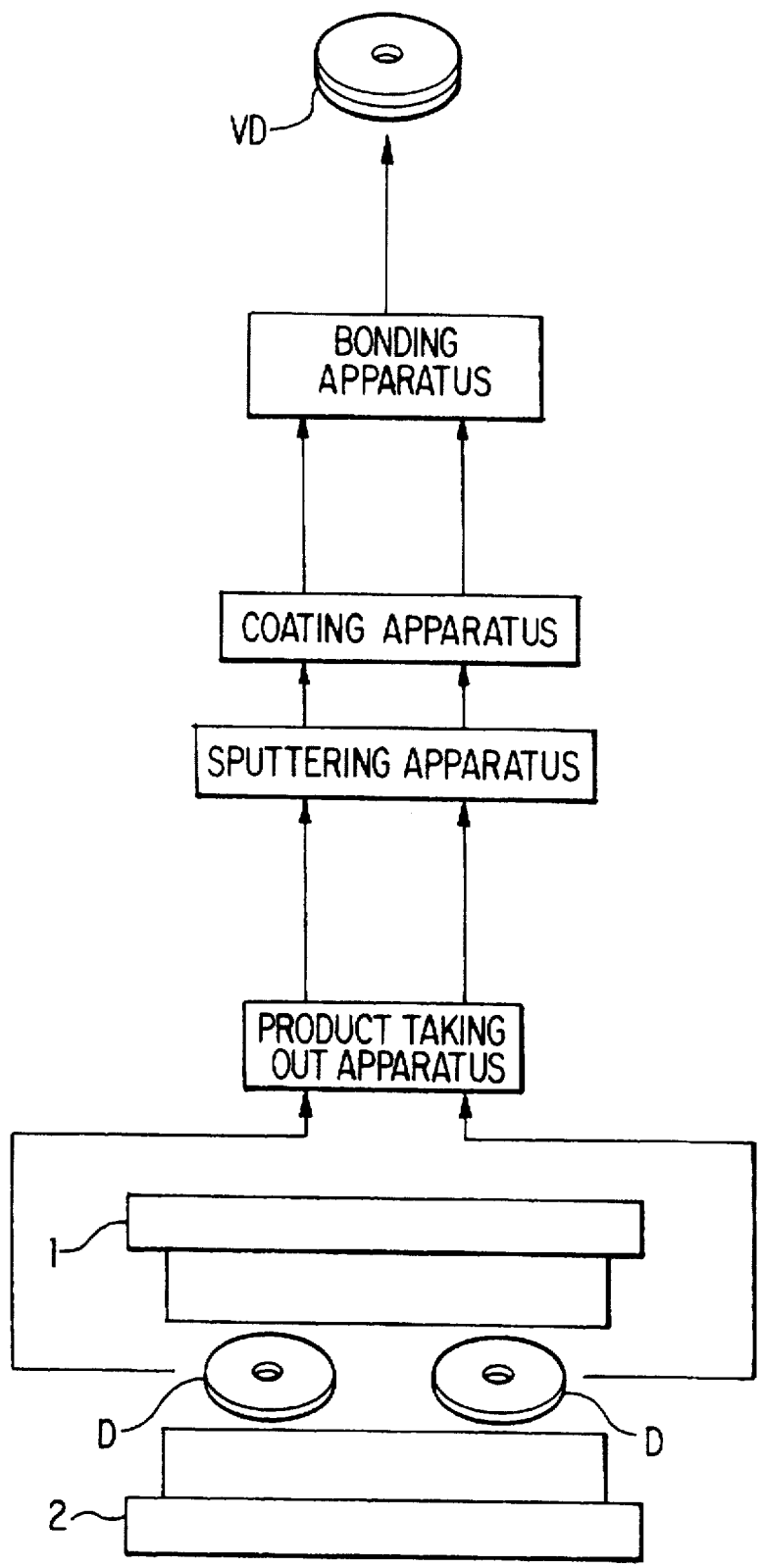
FIG. 1 is for explaining the processes for manufacturing a bonded disc according to the present invention.

First, an example of an apparatus for manufacturing a bonded disc according to the present invention will be explained based on FIGS. 1 to 5. The same reference numerals show the same portions or the corresponding portions in all figures.

An apparatus for manufacturing a bonded disc according to the present invention comprises in general, as shown in FIG. 1, an injection apparatus (not shown) to mold a disc base D by injecting a molten resin into a cavity formed by clamping a stationary mold 1 and a movable mold 2, which are disposed facing each other, a product taking out apparatus to take out the disc base D molded, a sputtering apparatus for forming a reflection layer on the disc base D, a coating apparatus for forming a protection layer on the disc base D formed with the reflection layer and a bonding apparatus for bonding two disc bases into one bonded disc VD.

Figure 2:
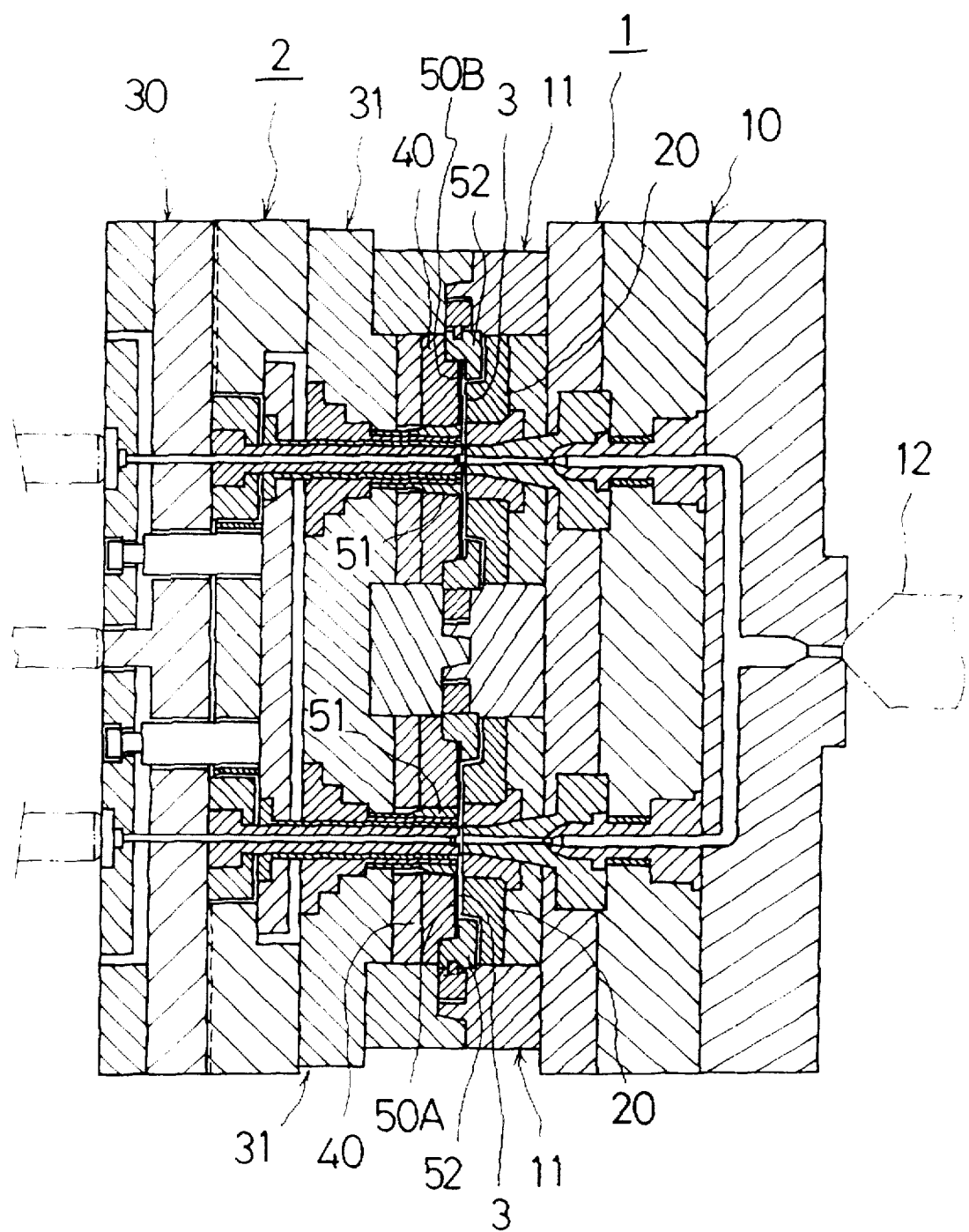
FIG. 2 is a sectional view of the mold which is used for molding disc bases for use of a bonded disc.

As shown in FIG. 2, the stationary mold 1 and the movable mold 2 are mounted facing each other on the fixed plate and the movable plate of the mold clamping device respectively (not shown), and by driving the mold clamping apparatus the movable plate is moved close to the fixed plate and by clamping the mold a pair of independent cavities 3, 3 are formed at the abutting face. Although a pair of cavities 3, 3 are shown in FIG. 2, without limiting to this, it may be provided with plural pairs of cavities.

Figure 3:
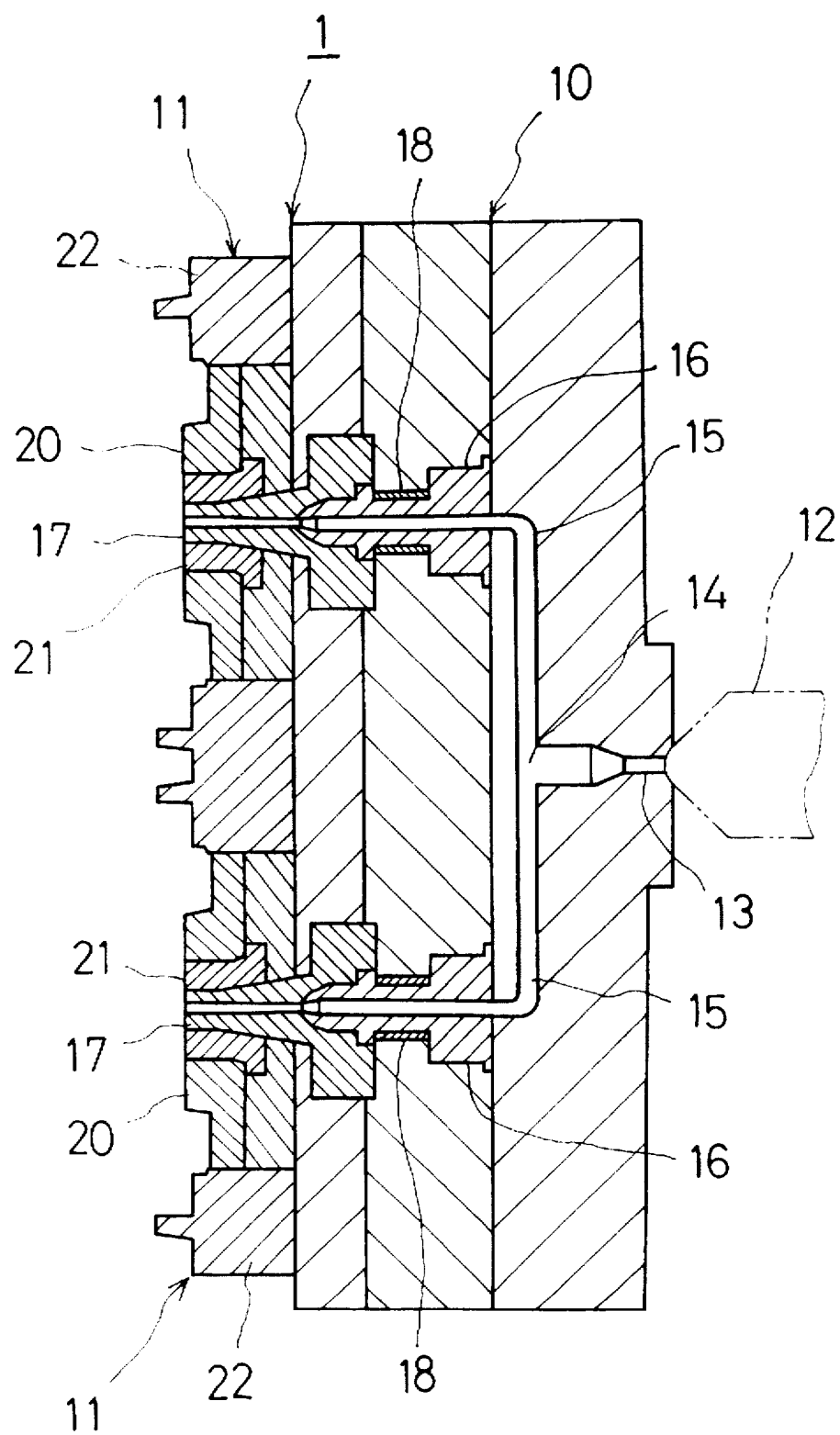
FIG. 3 shows a sectional and enlarged view of the stationary mold of the molds shown in FIG. 2.

The stationary mold 1, as shown in FIG. 3, is formed with a fixed mold base 10 mounted to a fixed plate and pair of stationary mold unit 11, 11 to form pair of cavities 3, 3. The fixed mold base 10 is provided with single molten resin inlet 13, into which a molten resin is poured from a nozzle 12 of injection apparatus, and from this inlet 13 branched, through a branched portion 14 molten resin introduction channels 15, 15 which are in communication with each cavity 3, 3, hot nozzles 16 to control the temperature of the resin introduced in the molten resin introduction channels 15 to a given temperature and a sprue bush 17 to introduce the molten resin into the cavities 3, 3. Around the hot nozzle 16 a heater 18 for controlling the temperature of the molten resin is provided. Each stationary mold unit 11 comprises a mirror block 20 forming the cavity surface, a gate insert 21 carrying concentrically a sprue bush 17 which is penetrated in the central portion of the mirror block in such a manner as it opens into the cavity 3 and a locate member 22 for positioning the mirror block 20 in the stationary mold base 10.

Figure 4:
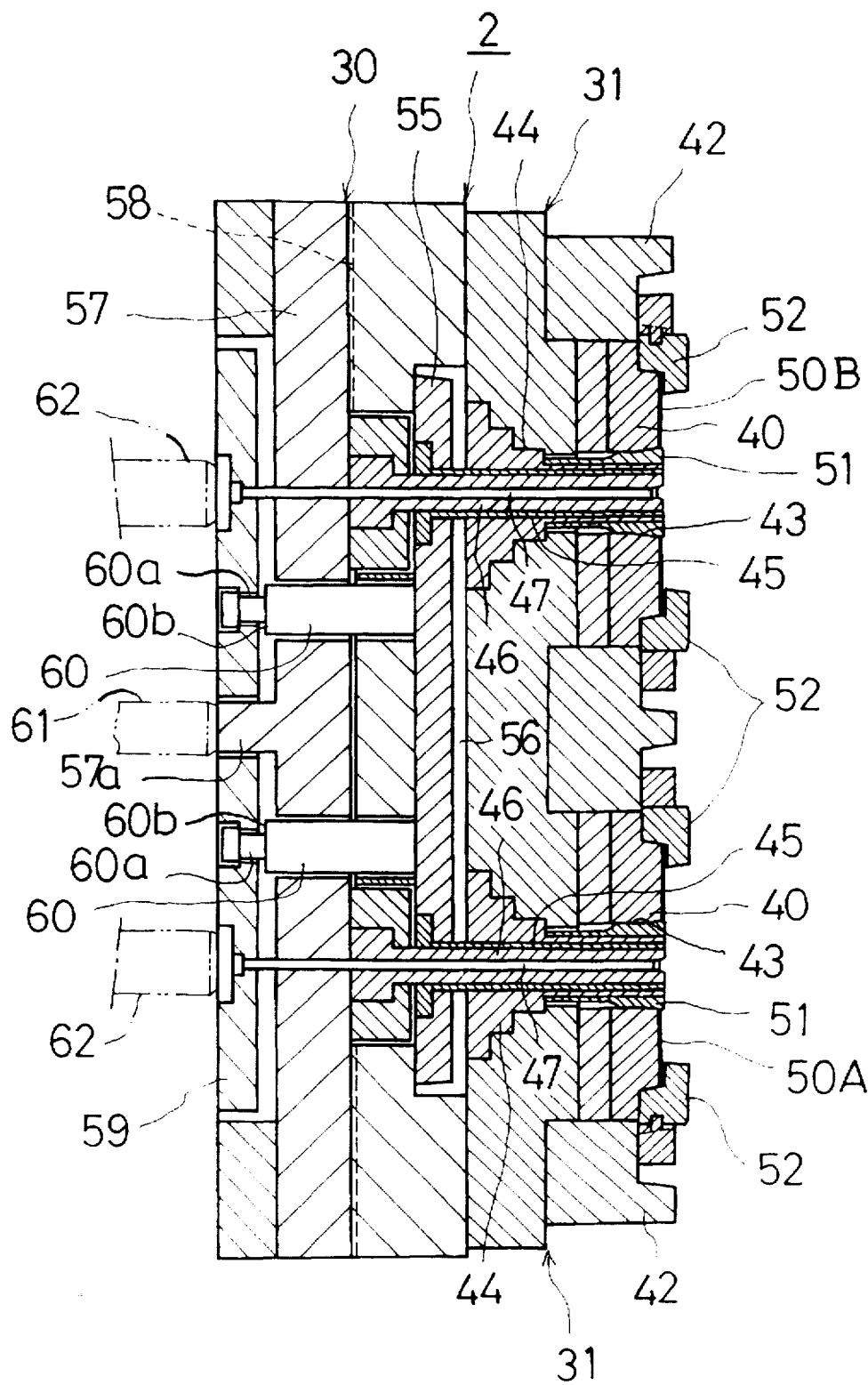
FIG. 4 shows a sectional and enlarged view of the movable mold of the molds shown in FIG. 2.

The movable mold 2, as shown in FIG. 4, is formed with a movable mold base 30 mounted to movable plate and a pair of movable mold unit 31 for forming a pair of cavities 3, 3. Each movable mold unit 31 is provided with a mirror block 40 to form a cavity surface and a locate member 42 for locating the mirror block 40 in the movable mold base 30. And, at the position of each mirror block 40 facing to the center of the cavity 3, a through hole 43 is formed, where a fixed sleeve 44 is provided, into which an ejector sleeve 45, a punch 46 and a central push out pin 47 are inserted in turn. In this embodiment, in order to be able to mount the stampers 50A and 50B for transferring information to a disc on the movable mold 2, each movable mold unit 31 is provided with a stamper inner circumference holding member 51 at the central portion and a stamper outer circumference holding ring 52 at the outside portion. The stamper inner circumference holding member 51 is coupled with the outside of the stationary sleeve 44 and the stamper outer circumference holding ring 52 is mounted with a bolt (not shown) on the locate member 42. Further, in this embodiment,it is explained as the structure where the stampers 50A, 50B for transferring information can be mounted on the movable mold 2, but it is not limited to the case, the stampers 50A and 50B may be mounted also on the stationary mold 1. At the rear end of an ejector sleeve 45, an ejector plate 55 is provided, which is disposed in the space 56 formed in the movable mold base 30. At the rear end of the punch 46, a cutter plate 57 is provided, which is disposed in the space 58 formed in the movable mold base 30. At the rear end of the central push out pin 47 a push out plate 59 is provided. The push out plate 59 is disposed in such a manner as it forms a same face with the back face of the movable mold base 30. On the backside of the ejector plate 55, a connecting rod 60 is provided in such a manner as it penetrates the cutter plate 57. At the tip end of the connecting rod 60, a small diameter portion 60a is provided, by which the push out plate 59 is penetrated movably. An abutting member 57a is provided on the back surface of the cutter plate 57 in such a manner as it penetrates the push out plate 59, on this abutting member 57a abuts a gate cut piston 61. On the rear surface of the push out pin 47 in the push out plate 59, the ejector piston 62 abuts.

In thus-constructed mold for molding a bonded disc, so as to make a disc to be a combination of different information, as shown in FIG. 2, the stamper 50A is mounted on the mirror surface of one mirror block 40 of the movable mold 2 by the inner circumference holding member 51 and the outer circumference holding member 52 and on the mirror surface of the other mirror block 40 the stamper 50B is mounted. The stamper 50A, for example, has an information pit which is helically formed, the information of which is transferrable optically by an optical head, and the stamper 50B is also arranged identically with the stamper 50A. By this structure, as in the prior art, bonded discs, to appropriately focused points of both surfaces of which information is transferred and reproduced optically by an optical head, are manufactured.

Figure 5:
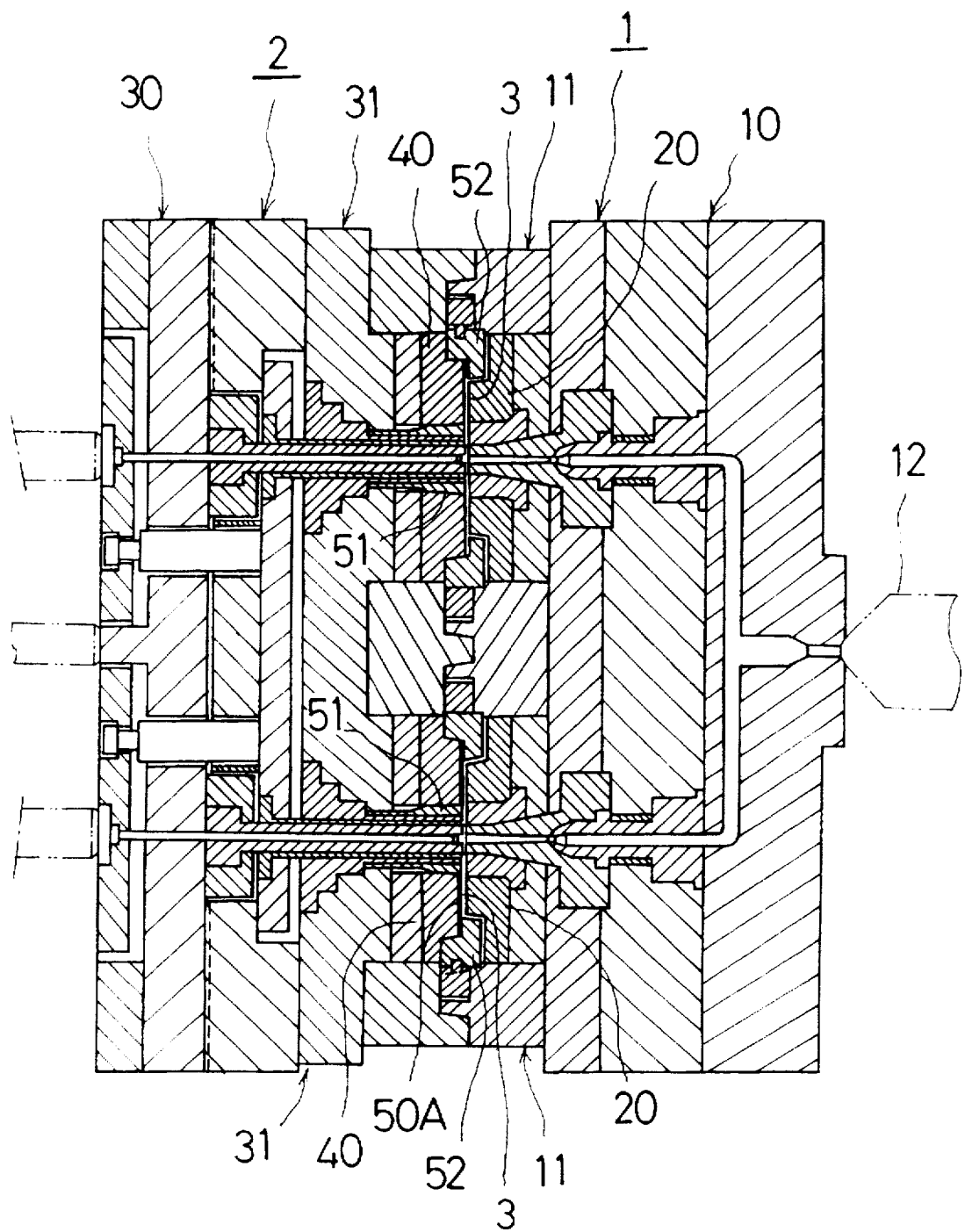
FIG. 5 shows the case where one of the cavities shown in FIG. 2 is not provided with a stamper.
Figure 6:
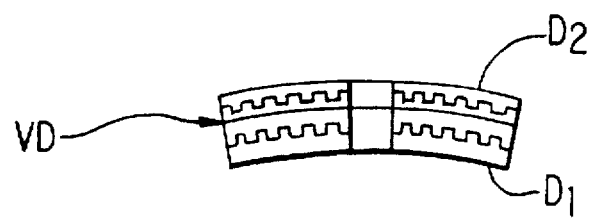
FIG. 6 exemplifies the bending of a conventional bonded disc after bonding.
Figure 6:
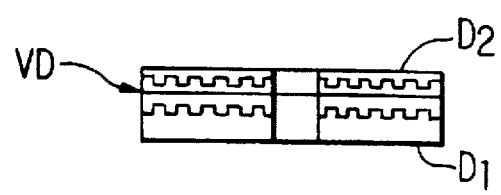
Figure 6:
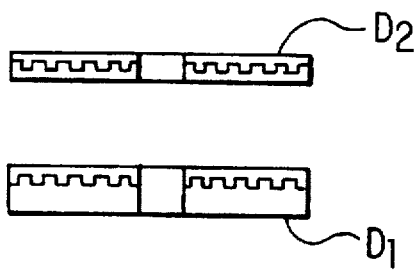

The stampers 50A and 50B, on each of the disc bases D of which are disposed in the cavities 3, 3 formed in a pair different information is transferred, are not limited to the above examples, but one of the 50A or 50B may be replaced by the hologram for letters or design which are expressed by the group of pit for being reproduced in place of the information pit transferred. Or, one of the 50A or 50B may be formed without being transferred by any information. Further, as shown in FIG. 5, either one of the stamper 50A or 50B is not disposed in the cavities and the surface of the disc base is formed by the surface itself of the mirror block 40. In other word, in the present invention, to make the information transferred on the disc bases into a different combination means includes the case where either one of the disc bases is not transferred by any information.

Next, a manufacturing method of the bonded discs of the present invention will be described using the thus formed molding apparatus. The pair of cavities 3,3 are formed at the abutting face of the stationary mold 1 and the movable mold 2 by clamping. And, when the molten resin is charged from the injection apparatus by abutting the nozzle 12 to the molten resin inlet 13, the molten resin is filled in the cavities 3,3 through the branched portion 14, the molten resin introduction channel 15, the hot nozzle 16 and the sprue bush 17 of each stationary mold unit 11. Because each cavity 3,3 is formed in the same mold, the disc bases are molded under the same conditions of molding.

When completing the injection and filling of the molten resin in the cavities 3,3, the gate cutting is carried out by the progress of the punch 46 due to pushing the cutter plate 57 through the abutting member 57a by progressing forward the gate cut piston 61. And, when the molten resin is cooled and solidified, after completing the opening of the mold by the drive of the mold clamp apparatus, the sprue is pushed out by pushing out of the center push out pin 47 which is caused by the pushing of the push out plate 59 due to the progress of the ejector piston 62. Further, when further progressing the ejector piston 62, the ejector plate 55 is pressed due to the abutting of the push out plate 59 penetrated by the small diameter portion 60a to a step 60b of the connecting rod 60, thereby the ejector sleeve 45 is projected out to push out the disc base.

Each disc base D finished in molding, as shown in FIG. 1, each product is taken out from the mold by the product taking out apparatus, and each is coated with a reflection layer by the sputtering apparatus and further each is coated with such as spinning coating as a protection layer by the coating apparatus, subsequently two of them are bonded with the bonding apparatus into a single disc VD. Since the disc bases VD are molded by a pair of cavities 3, 3 formed in an identical mold under the identical condition using the material of the same lot, the mechanical properties can be made similar. Therefore, because of bonding disc bases D molded in the same mold, the problems generated by the time elapsing after bonding such as stress distortion, bending, twisting or peeling off at the sticking face can be avoided.

Next, the bonded discs manufactured by the mold for molding the disc bases thus constructed according to the present invention will be explained. As mentioned above, in the manufacture of the bonded discs VD are carried out by bonding two disc bases D on which two different information are recorded. And, in the case where either one of the stampers 50A or 50B is the one in which the information pit is formed,the other one is for a hologram of some letters or paintings, one disc is manufactured, in which on one side some information to be reproduced by an optical head is transferred, and on the other side a hologram is formed. In this case, it is preferable to bond two disc bases which are molded in the above manufacturing method simultaneously in the same mold using the material of the same lot, however, it may be manufactured by a conventional molding, in which one disc base is molded in single cavity and transferred of an information, the other disc base molded separately and having a hologram, and these two disc bases are bonded.

Further, similarly, in the case where either one of the stampers 50A or 50B is prepared without information in place of the formation of an information, or either one of the stampers 50A or 50B (50B in FIG. 5) is not disposed in the cavity to mold one disc base having the surface molded correspondingly to the face of the mirror block 40, the bonded disc becomes one bonded disc which has on one side an information transferred and on the other side a sheet printed in some letters such as title can be attached.

According to the structure of the claim 1, by bonding two disc bases which are molded in pair of separated cavities in an identical mold and having different information each other, so that, a mechanical property can be increased.

According to the structure of the claim 2, a pair of cavities are formed in an identical mold and a different combination of disc bases is simultaneously molded, so that the disc bases for being bonded are molded with an increased successful rate, and due to molding under an identical condition the disc bases when bonded each other show an increasing of the mechanical property.

According to the structure of the claim 3 and 4, since the disc base having the information and the disc base having no information, which are molded in a pair of cavities are bonded, a disc which has the information to be reproduced on only one side thereof is obtained.

According to the structure of the claim 5, the disc bases are molded simultaneously in a pair of cavities formed in a mold, and said molded disc bases are bonded, so that the molding efficiency of the disc bases to be bonded is increased and since the disc bases molded under an identical condition are bonded, the mechanical property thereof is increased.

According to the structure of the claim 6, since different stampers are disposed in a pair of cavities in an identical mold, by sticking the disc bases molded in said cavities one disc having a combination of different information is manufactured.

According to the structure of the claim 7, since in a pair of cavities formed in an identical mold, one of the stampers is disposed without information, and these two disc bases are bonded, a disc which has the information to be reproduced on only one side thereof is obtained.

According to the structure of the claim 8, in one of the pair of cavities formed in a mold no stamper is disposed, so that, by bonding disc bases molded in the pair of cavities, a disc which has the information to be reproduced on only one side thereof is obtained.

What is claimed is:

1. A bonded disc characterized in that two disc bases which are molded in a pair of cavities formed in a mold and having different information are bonded.

2. An apparatus for manufacturing a bonded disc characterized in that said apparatus comprises a mold having a pair of cavities formed in the mold for molding two disc bases.

3. An apparatus according to the claim 2, wherein one of the pair of cavities comprises no information on the surface of a stamper.

4. An apparatus according to the claim 2, wherein one of the pair of cavities is not disposed with a stamper.

5. In a method for manufacturing a bonded disc wherein two disc bases are bonded characterized in that simultaneously two disc bases are molded in a pair of cavities formed in a mold, and said molded disc bases are bonded.

6. A method according to the claim 5, wherein said pair of cavities are disposed with different stampers.

7. A method according to the claim 6, wherein one of said pair of cavities is disposed with a stamper having no information.

8. A method according to the claim 5, wherein one of said pair of cavities is not disposed with a stamper.

* * * * *